United States Patent
Nakatsuru et al.

(10) Patent No.: US 11,985,151 B2
(45) Date of Patent: May 14, 2024

(54) GENERATION DEVICE, GENERATION METHOD, AND GENERATION PROGRAM

(71) Applicant: NIPPON TELEGRAPH AND TELEPHONE CORPORATION, Tokyo (JP)

(72) Inventors: Takeshi Nakatsuru, Musashino (JP); Tomoyasu Sato, Musashino (JP); Takuya Minami, Musashino (JP); Naoto Fujiki, Musashino (JP); Masami Izumi, Musashino (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 689 days.

(21) Appl. No.: 17/254,875

(22) PCT Filed: Jul. 2, 2019

(86) PCT No.: PCT/JP2019/026239
§ 371 (c)(1),
(2) Date: Dec. 22, 2020

(87) PCT Pub. No.: WO2020/009094
PCT Pub. Date: Jan. 9, 2020

(65) Prior Publication Data
US 2021/0273963 A1    Sep. 2, 2021

(30) Foreign Application Priority Data
Jul. 2, 2018    (JP) .................................. 2018-126189

(51) Int. Cl.
*H04L 29/06*    (2006.01)
*G06F 21/55*    (2013.01)
*H04L 9/40*    (2022.01)

(52) U.S. Cl.
CPC ........ *H04L 63/1425* (2013.01); *G06F 21/554* (2013.01); *H04L 63/1416* (2013.01)

(58) Field of Classification Search
None
See application file for complete search history.

(56) References Cited

U.S. PATENT DOCUMENTS

| 9,558,053 B1 | 1/2017 | Mcclintock et al. |
| 2006/0070130 A1 | 3/2006 | Costea et al. |

(Continued)

FOREIGN PATENT DOCUMENTS

| CN | 102460529 A | 5/2012 |
| CN | 104518905 A | 4/2015 |

(Continued)

OTHER PUBLICATIONS

Nakata et al., "A Method of Extracting Common Malware Communication Patterns from Dynamic Analysis Result", Proceedings of Computer Security Symposium, Oct. 14, 2015, pp. 318-325.

(Continued)

*Primary Examiner* — Andrew J Steinle
(74) *Attorney, Agent, or Firm* — XSENSUS LLP (57) ABSTRACT

A generation device includes a memory, and processing circuitry coupled to the memory and configured to sense anomaly of a network based on information having a plurality of items related to communication in the network, identify a cause of anomaly corresponding to each piece of the information when anomaly is sensed, and generate, based on values of the items in the information and the cause of anomaly identified, a cause-of-anomaly pattern for each predetermined set of pieces of the information.

12 Claims, 9 Drawing Sheets

(56) References Cited

U.S. PATENT DOCUMENTS

| | | | | |
|---|---|---|---|---|
| 2009/0271504 | A1* | 10/2009 | Ginter | H04L 63/02 |
| | | | | 709/220 |
| 2012/0136629 | A1 | 5/2012 | Tamaki et al. | |
| 2014/0165207 | A1 | 6/2014 | Engel et al. | |
| 2017/0223037 | A1 | 8/2017 | Singh et al. | |
| 2019/0050747 | A1 | 2/2019 | Nakamura et al. | |
| 2021/0116331 | A1* | 4/2021 | Kawai | G06F 16/2358 |

FOREIGN PATENT DOCUMENTS

| | | | | |
|---|---|---|---|---|
| JP | 2006-41969 | A | 2/2006 | |
| JP | 2013-11949 | A | 1/2013 | |
| JP | 2017-84296 | A | 5/2017 | |
| WO | 2017/154844 | A1 | 9/2017 | |
| WO | 2018/104985 | A1 | 6/2018 | |
| WO | WO-2018224670 | A1 * | 12/2018 | G06K 9/6218 |

OTHER PUBLICATIONS

Imai et al., "Anomaly Detection Based on Clustering of Network Traffic Characteristics Considering Results of Signature Based IDS Evaluation", IEICE Technical Report, vol. 114, No. 489, Feb. 24, 2015, pp. 7-12.
A. Spadaro, "Event correlation for detecting advanced multi-stage cyber-attacks", Delft University of Technology, M.Sc. Thesis, Jul. 12, 2013, 151 pp.

\* cited by examiner

ROW INFORMATION

| No | SOURCE ADDRESS | DESTINATION ADDRESS | SOURCE PORT | DESTINATION PORT | DURATION ms | PROTOCOL | THE NUMBER OF UPLINK BYTES | THE NUMBER OF DOWNLINK BYTES | COMMUNICATION TYPE | IDS SIGNATURE | SOURCE ADDRESS CLASSIFICATION | DESTINATION ADDRESS CLASSIFICATION |
|---|---|---|---|---|---|---|---|---|---|---|---|---|
| (1) | 11.11.11.1 | 99.99.99.1 | 6332 | 80 | 300 | TCP | 100 | 10 | HTTP | C2 COMMUNICATION | IN-NETWORK ADDRESS | C2 SERVER |
| (2) | 11.11.11.1 | 11.11.11.2 | 6600 | 23 | 100 | TCP | 10 | 10 | TELNET | LOGIN TRIAL/ SUCCESSFUL | IN-NETWORK ADDRESS | IN-NETWORK ADDRESS |
| (3) | 11.11.11.1 | 11.11.11.3 | 6500 | 23 | 105 | TCP | 19 | 10 | TELNET | LOGIN TRIAL/ SUCCESSFUL | IN-NETWORK ADDRESS | IN-NETWORK ADDRESS |
| (4) | 11.11.11.1 | 11.11.11.4 | 6700 | 23 | 98 | TCP | 10 | 10 | TELNET | LOGIN TRIAL/ FAILED | IN-NETWORK ADDRESS | IN-NETWORK ADDRESS |
| (5) | 99.99.99.2 | 11.11.11.2 | 1235 | 23 | 90 | TCP | 10 | 10 | TELNET | EXTERNAL INTRUSION | C2 SERVER | IN-NETWORK ADDRESS |
| (6) | 99.99.99.2 | 11.11.11.3 | 46543 | 23 | 60 | TCP | 11 | 11 | TELNET | EXTERNAL INTRUSION | C2 SERVER | IN-NETWORK ADDRESS |
| (7) | 11.11.11.2 | 99.99.99.3 | 6500 | | | TCP | 10 | 10 | HTTP | MALWARE DL | IN-NETWORK ADDRESS | MALWARE DISTRIBUTION SITE |
| (8) | 11.11.11.3 | 99.99.99.3 | 6700 | | | TCP | 10 | 10 | HTTP | MALWARE DL | IN-NETWORK ADDRESS | MALWARE DISTRIBUTION SITE |
| (9) | 11.11.11.2 | 100.88.99.11 | 1235 | 80 | 80 | TCP | 10 | 10 | HTTP | DOS | IN-NETWORK ADDRESS | GENERAL WEB SERVER |
| (10) | 11.11.11.3 | 100.88.99.11 | 32353 | 80 | 80 | TCP | 10 | 10 | HTTP | DOS | IN-NETWORK ADDRESS | GENERAL WEB SERVER |

GENERATION DEVICE, GENERATION METHOD, AND GENERATION PROGRAM

CROSS-REFERENCE TO RELATED APPLICATIONS

The present application is based on PCT filing PCT/JP2019/026239, filed Jul. 2, 2019, which claims priority to JP 2018-126189, filed Jul. 2, 2018, the entire contents of each are incorporated herein by reference.

TECHNICAL FIELD

The present invention relates to a generation device, a generation method, and a generation program.

BACKGROUND ART

Practically used conventional methods of sensing anomaly due to malware infection or the like in an instrument such as a personal computer (PC) include a black-list scheme in which anomaly is sensed by comparing the behavior pattern of the instrument with a known anomaly pattern, and a white-list scheme in which anomaly is sensed by comparing the behavior pattern of the instrument with the behavior pattern in a normal state.

In another known technology, anomaly determination is performed based on system load information, and a function executed at an instrument in which anomaly occurs is identified and registered to a black list, whereas a function executed at an instrument in which no anomaly occurs is registered to a white list.

CITATION LIST

Patent Literature

Patent Literature 1: Japanese Laid-Open Patent Publication No. 2017-84296

SUMMARY OF THE INVENTION

Technical Problem

However, the conventional technologies have such a problem that cause-of-anomaly identification cannot be efficiently performed in some cases. For example, by the black-list scheme, in which an anomaly pattern is determined in advance, it is possible to identify a cause of anomaly when match is made with the determined anomaly pattern, but it is difficult to sense anomaly due to unknown malware or the like. By the white-list scheme, it is possible to sense, as anomaly, any behavior pattern that does not match with that in the normal state, but it is difficult to identify a cause of anomaly.

With the technology of identifying a function executed at an instrument in which anomaly occurs and registering the function to a black list, and registering, to a white list, a function executed at an instrument in which no anomaly occurs, it is possible to identify only a function performing anomalous operation but difficult to identify a cause of anomaly.

Means for Solving the Problem

To solve the above-described problem and achieve an objective, a generation device according to the present invention includes: a memory; and processing circuitry coupled to the memory and configured to: sense anomaly of a network based on information having a plurality of items related to communication in the network, identify a cause of anomaly corresponding to each piece of the information when anomaly is sensed, and generate, based on values of the items in the information and the cause of anomaly identified, a cause-of-anomaly pattern for each predetermined set of pieces of the information.

Effects of the Invention

According to the present invention, it is possible to efficiently perform cause-of-anomaly identification.

DESCRIPTION OF EMBODIMENTS

Embodiments of a generation device, a generation method, and a generation program according to the present application will be described below in detail with reference to the accompanying drawings. The present invention is not limited by the embodiments described below.

Figure 1:
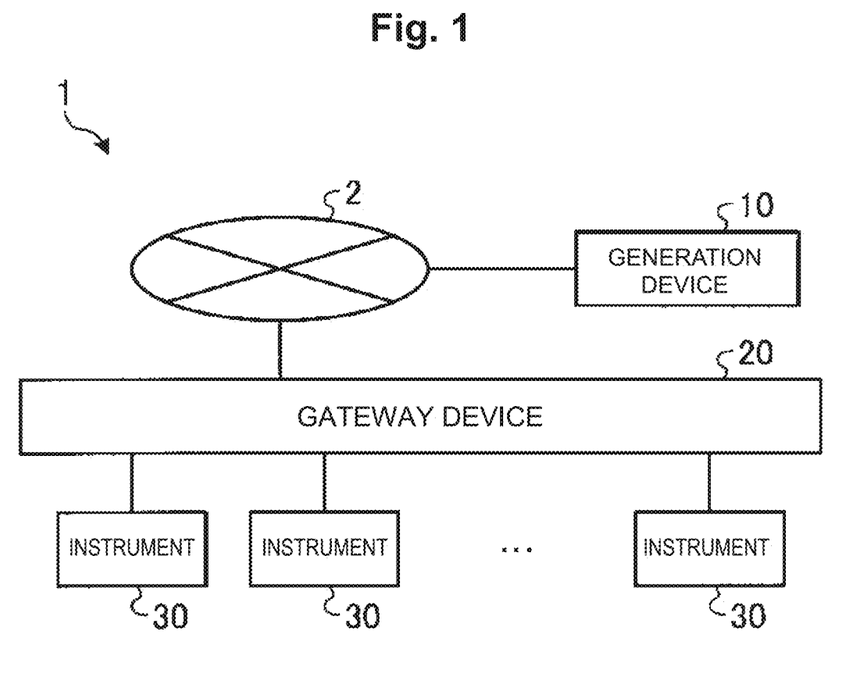
FIG. 1 is a diagram illustrating an exemplary configuration of a generation system according to a first embodiment.

[Configuration of first embodiment] The following first describes the configuration of a generation system according to a first embodiment with reference to FIG. 1. FIG. 1 is a diagram illustrating an exemplary configuration of the generation system according to the first embodiment. As illustrated in FIG. 1, this generation system 1 includes a generation device 10, a gateway device 20, and an instrument 30. The generation device 10 and the gateway device 20 are connected with each other to perform communication therebetween through a network 2. The instrument 30 is connected with the gateway device 20 to perform communication therebetween.

The instrument 30 is, for example, a terminal device such as a PC or a smartphone. The network 2 is, for example, the Internet. The gateway device 20 is connected with a local area network (LAN) with which the instrument 30 is connected, and captures a communication log of communication performed by the instrument 30 or an operation log of the instrument 30. The generation device 10 acquires information related to communication through the network 2 and performs anomaly sensing and cause-of-anomaly identification. Hereinafter, the information related to communication is also referred to as a communication feature amount.

The communication feature amount acquired by the generation device 10 includes, for example, the address and port number of a data transmission source or destination in communication. The communication feature amount may also include the duration of communication and the number of bytes.

Figure 2:
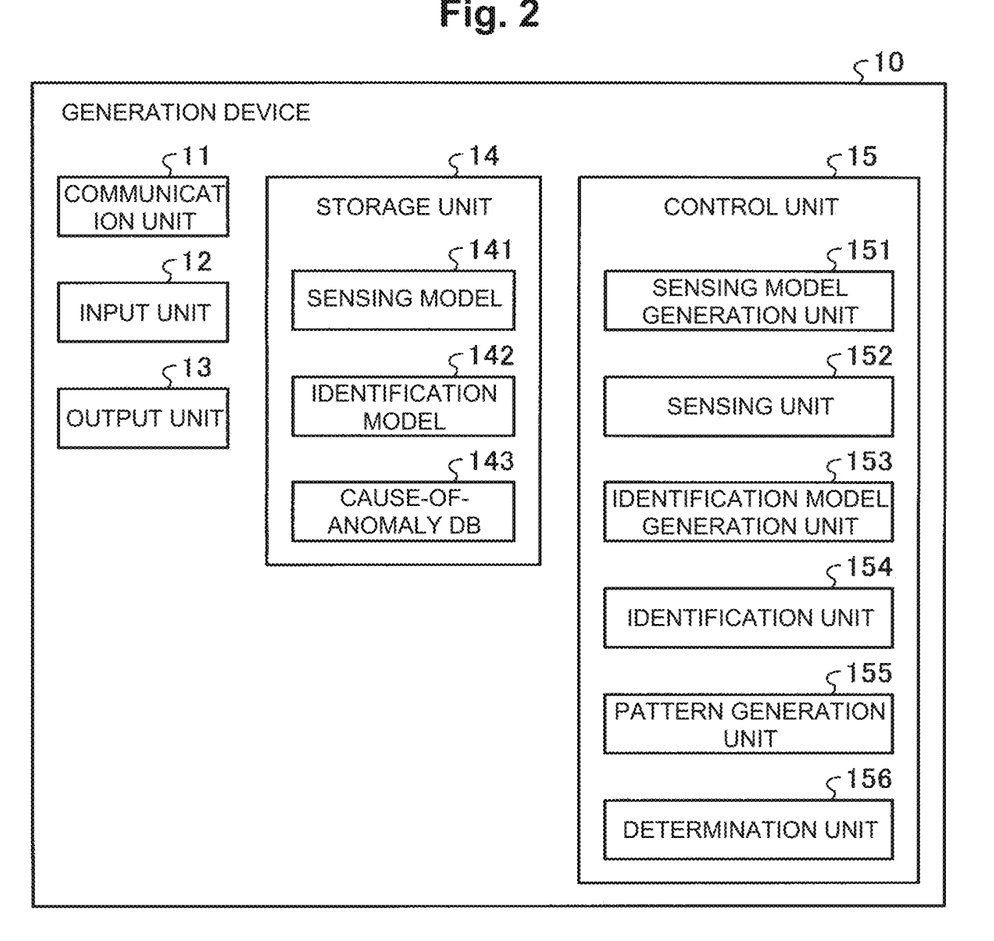
FIG. 2 is a diagram illustrating an exemplary configuration of the generation device according to the first embodiment.

The following describes the configuration of the generation device according to the first embodiment with reference to FIG. 2. FIG. 2 is a diagram illustrating an exemplary configuration of the generation device according to the first embodiment. As illustrated in FIG. 2, the generation device 10 includes a communication unit 11, an input unit 12, an output unit 13, a storage unit 14, and a control unit 15.

The communication unit 11 communicates data with another device through a network. The communication unit 11 is, for example, a network interface card (NIC). The input unit 12 receives inputting of data from a user. The input unit 12 is an input device such as a mouse or a keyboard. The output unit 13 outputs data through screen display or the like. The output unit 13 is a display device such as a display.

The input unit 12 and the output unit 13 may be an input interface and an output interface, respectively. For example, the input unit 12 and the output unit 13 perform data inputting from and outputting to another device connected with the generation device 10 or a medium such as a memory card or a universal serial bus (USB) memory. The input unit 12 may also receive, as input data, data received by the communication unit 11. The output unit 13 may also output data to the communication unit 11.

The storage unit 14 is a storage device such as a hard disk drive (HDD), a solid state drive (SSD), or an optical disk. Alternatively, the storage unit 14 may be a data rewritable semiconductor memory such as a random access memory (RAM), a flash memory, or a non volatile static random access memory (NVSRAM). The storage unit 14 stores an operating system (OS) and various computer programs to be executed on the generation device 10. The storage unit 14 also stores various kinds of information used in execution of a computer program. In addition, the storage unit 14 stores a sensing model 141, an identification model 142, and a cause-of-anomaly DB 143.

The sensing model 141 is a model for sensing anomaly of the network 2. The sensing model 141 may be a model for sensing the instrument 30 being anomalous. The sensing model 141 includes, for example, sensing by using the signature of a security product (intrusion prevention system (IPS), intrusion detection and prevention (IDS), web application firewall (WAF), or the like), and a function and a parameter for calculating an anomaly score from the communication feature amount.

The identification model 142 is a model for identifying a cause of anomaly of the instrument 30. The identification model 142 is, for example, a machine-learned model in which the signature of a security product (IPS, IDS, WAF, or the like), a cause of anomaly, and the communication feature amount for identifying the cause of anomaly are written.

The cause-of-anomaly DB 143 stores information for identifying a cause of anomaly. The cause-of-anomaly DB 143 stores data that are used for cause-of-anomaly identification by the identification model 142 and an incident pattern to be described later.

Figure 3:
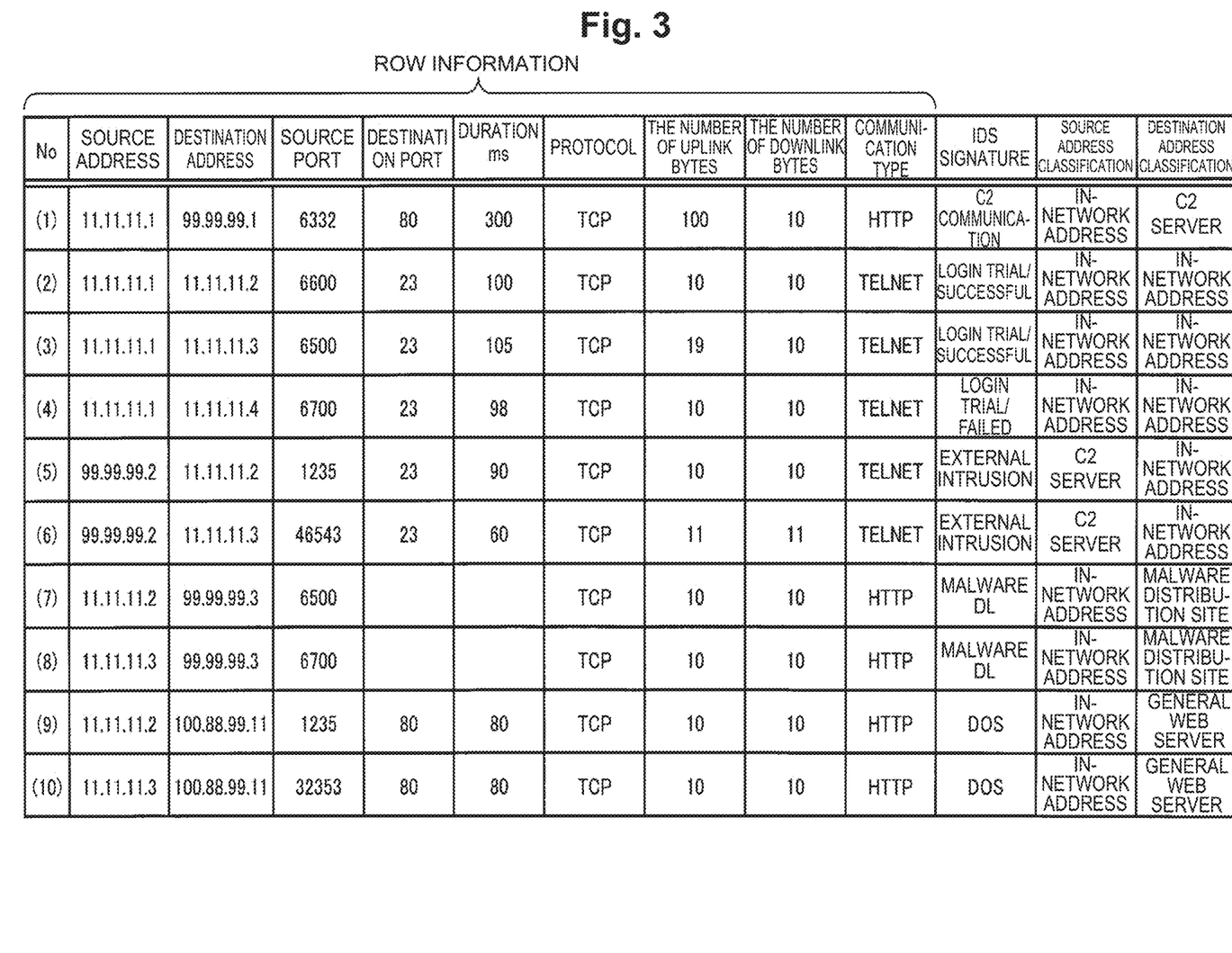
FIG. 3 is a diagram illustrating exemplary row information according to the first embodiment.

The cause-of-anomaly DB 143 stores, for example, information including row information illustrated in FIG. 3. FIG. 3 is a diagram illustrating exemplary row information according to the first embodiment. As illustrated in FIG. 3, the row information includes a source address, a destination address, a source port, a destination port, a duration, a protocol, the number of uplink bytes, the number of downlink bytes, and a communication type. The row information is, for example, raw data included in the communication feature amount. The row information is exemplary information having a plurality of items related to communication through the network 2.

The cause-of-anomaly DB 143 also stores an IDS signature as a cause of anomaly corresponding to each piece of the row information. The IDS signature may be information generated by the generation device 10 based on the row information by using the identification model 142 or may be information acquired from another device or the like. The IDS signature is, for example, information in which whether an IP address belongs to an internal network or an external network is identified based on configuration management information. Alternatively, the IDS signature is, for example, information acquired from a black list DB of threatening IP addresses.

In addition, the cause-of-anomaly DB 143 stores meta information generated from the value of an item that does not change through environment change or the like. Consider an example in which a plurality of sites are infected with the same malware. In this case, it is thought that information of a local network including infected terminals changes due to infection outspread, malware disinfestation, or the like. It is also thought that places to which the same malware accesses do not frequently change. For example, trials of login to 11.11.11.2 to 11.11.11.4 from an infected terminal 11.11.11.1 are recorded in (2), (3), and (4) in FIG. 3. In this case, the IP address of an infected terminal and a terminal to which the infected terminal tries to log in depend on environment infected with malware and are not constant in many cases. In addition, downloading of malware from a terminal 99.99.99.3 to infected terminals is recorded in (7) and (8). In this case, although infected terminals depend on environment, an URL or IP address from which malware is downloaded is constant in many cases. It is known that, in this manner, whether an IP address has meaning changes depending on the classification of the address.

The cause-of-anomaly DB 143 also stores an incident pattern per flow. Assume that the pieces of the row information (1) to (10) in FIG. 3 are the row information per flow. In this case, the cause-of-anomaly DB 143 stores, for example, an incident pattern uniquely generated for each piece of the row information (1) to (10). Each incident pattern is generated by a pattern generation unit 155 to be described later.

The control unit 15 controls the entire generation device 10. For example, the control unit 15 is an electronic circuit such as a central processing unit (CPU), a graphics processing unit (GPU), a tensor processing unit (TPU), or a micro processing unit (MPU), or is an integrated circuit such as an application specific integrated circuit (ASIC) or a field programmable gate array (FPGA). The control unit 15 includes an internal memory for storing computer programs that define various processing procedures, and control data, and executes each processing by using the internal memory. The control unit 15 functions as various processing units by operating various computer programs. The control unit 15 includes, for example, a sensing model generation unit 151, a sensing unit 152, an identification model generation unit 153, an identification unit 154, the pattern generation unit 155, and a determination unit 156.

The sensing model generation unit 151 generates, based on information related to communication through the network 2 in normal operation, the sensing model 141 for sensing anomaly of the network 2. For example, the sensing model generation unit 151 performs learning of the sensing model 141 so that the sensing model 141 outputs an anomaly score that is higher as similarity between input sensing target data and normal data is lower.

The sensing unit 152 senses anomaly of the network 2 based on information having a plurality of items related to communication through the network 2. The sensing unit 152 senses anomaly of the network 2 based on, for example, sensing target information by using the sensing model 141. The sensing target information may be the row information.

For example, the sensing unit 152 inputs the sensing target information to the sensing model 141. When the anomaly score output from the sensing model 141 is equal to or larger than a threshold, the sensing unit 152 senses anomaly of the network 2. When the sensing model 141 is a signature, the sensing unit 152 can sense the anomaly by signature matching. As illustrated in FIG. 3, the sensing unit 152 stores, in the cause-of-anomaly DB 143 as the IDS signature, the meta information when the anomaly is sensed. For example, an above-described security product or the sensing model 141 can classify the sensed anomaly for each flow. The sensing unit 152 may store such classification as the IDS signature.

The identification model generation unit 153 generates, based on information related to communication through the network 2, the identification model 142 for identifying a cause of anomaly of the network 2. For example, the identification model generation unit 153 performs, based on the cause-of-anomaly DB 143, learning of the identification model 142 so that the identification model 142 outputs a cause of anomaly associated with a communication feature amount similar to an input communication feature amount.

The identification unit 154 identifies a cause of anomaly corresponding to each piece of information when anomaly is sensed by the sensing unit 152. For example, the identification unit 154 identifies a cause of anomaly corresponding to each piece of the sensing target information by using the identification model 142 when anomaly is sensed by the sensing unit 152. For example, when anomaly is sensed by the sensing unit 152, the identification unit 154 inputs the sensing target information to the identification model 142 and acquires a cause of anomaly output from the identification model 142. When the identification model 142 is a signature, the identification unit 154 can identify a cause of anomaly by signature matching.

The pattern generation unit 155 generates, based on the values of the items that a communication feature amount has and the cause of anomaly identified by the identification unit 154, a cause-of-anomaly pattern for a predetermined set of communication feature amounts. In this case, the pattern generation unit 155 may generate the pattern based on the meta information generated from the values of the items in the information. Alternatively, the pattern generation unit 155 may generate a cause-of-anomaly pattern for each set of pieces of the sensing target information per flow. Hereinafter, each pattern generated by the pattern generation unit 155 is also referred to as an incident pattern.

Figure 4:
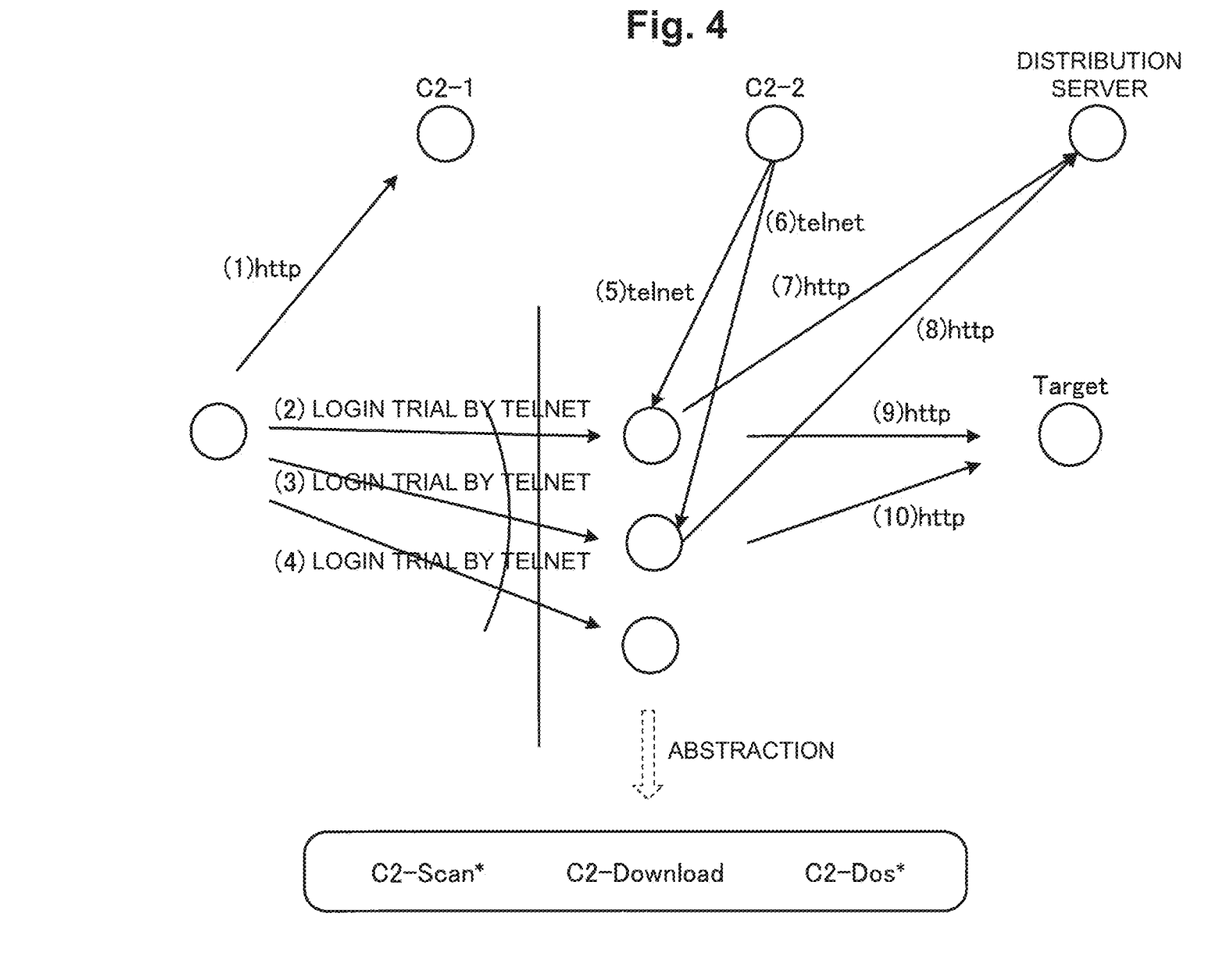
FIG. 4 is a diagram for description of incident pattern generation according to the first embodiment.

The following describes incident pattern generation with reference to FIG. 4. FIG. 4 is a diagram for description of incident pattern generation according to the first embodiment. FIG. 4 is a diagram schematically illustrating the contents of communication included in flows.

In FIG. 4, the reference number (1) indicates that an instrument 30 performs http communication to a C2 server C2-1. The reference numbers (2) to (4) each indicate that one of instruments 30 performs login trial to another instrument 30 by telnet. The reference numbers (5) and (6) each indicate that an instrument 30 performs telnet communication with a C2 server C2-2. The reference numbers (7) and (8) each indicate that the instrument 30 performs http communication with a distribution server that provides a malware distribution site. The reference numbers (9) and (10) each indicate that the instrument 30 performs http communication with a general Web server Taeget.

Assume that the sensing unit 152 has sensed anomaly based on a communication feature amount when a communication included in the flow illustrated in FIG. 4 is performed. In this case, the identification unit 154 identifies a cause of anomaly for each communication feature amount corresponding to one of the communications (1) to (10).

Then, the pattern generation unit 155 collects and stores the communication feature amount and the identified cause of anomaly as the row information and the IDS signature in the cause-of-anomaly DB 143 as illustrated in FIG. 3. In addition, the pattern generation unit 155 generates the meta information based on predetermined information.

For example, the IDS signature, the source address classification, and the destination address classification of (1) in FIG. 3 are "C2 communication", "in-network address", and "C2 server", respectively. The IDS signature, the source address classification, and the destination address classification of each of (2) and (3) are "login trial/successful", "in-network address", and "in-network address", respectively. The IDS signature, the source address classification, and the destination address classification of (4) are "login trial/unsuccessful", "in-network address", and "in-network address", respectively. Accordingly, the pattern generation unit 155 determines that (1) to (4) are attributable to scanning (C2-Scan) based on an instruction from a C2 server.

Similarly, the pattern generation unit 155 determines that (5) to (8) are attributable to download (C2-Download) based on an instruction from a C2 server. In addition, the pattern generation unit 155 determines that (9) and (10) are attributable to Dos attack (C2-Dos) based on an instruction from a C2 server.

The pattern generation unit 155 generates, based on meta information generated from the values of the items that information has, a pattern indicating combination of causes of anomaly per flow corresponding to the information, the pattern being capable of expressing that a plurality of flows correspond to each cause of anomaly. The pattern generation unit 155 generates, for example, an incident pattern "C2-Scan* C2-Download C2-Dos*".

The symbol "*" indicates the existence of a plurality of flows. For example, in scanning by a C2 server, flows can change depending on the number of scanned ports and the number of instruments existing in the network. In DoS attack, the number of HTTP flows that occur is not constant, depending on instrument performance and the like. Thus, when the number of flows is limited in the incident pattern, there is thought to be a case in which comparison and search cannot be performed due to difference in the number of flows even when the same incident pattern exists. Thus, to facilitate comparison and search of an incident pattern, the pattern generation unit 155 generates an incident pattern to which a plurality of flows are bundled and abstracted. The incident pattern "C2-Scan* C2-Download C2-Dos*" means that "after scanning from a plurality of transmission sources occurs, download from a C2 server is performed, and Dos attack from a plurality of transmission sources is started". The symbol "*" may indicate that flows exist in an optional number including one.

The determination unit 156 refers to the storage unit 14 storing a pattern generated by the pattern generation unit 155. Subsequently, when a first pattern is generated by the pattern generation unit 155, the determination unit 156 determines whether the first pattern is identical to the pattern stored in the storage unit 14. In other words, the determination unit 156 can determine whether an incident pattern newly generated by the pattern generation unit 155 is identical to an incident pattern generated in the past.

Figure 5:
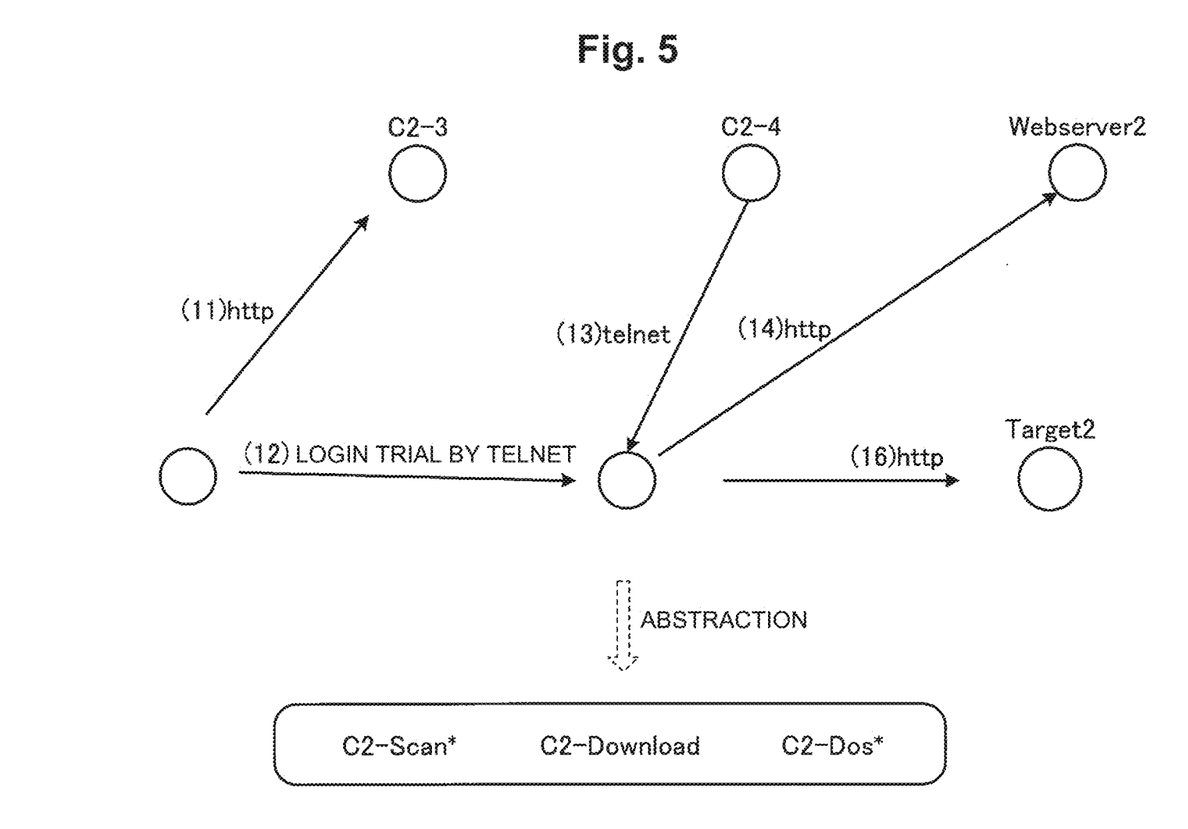
FIG. 5 is a diagram for description of incident pattern determination according to the first embodiment.

FIG. 5 is a diagram for description of the incident pattern determination according to the first embodiment. The reference number (11) in FIG. 5 indicates that the instrument 30 performs http communication to a C2 server C2-3. The reference number (12) indicates that one of instruments 30 performs telnet login trial to another instrument 30. The reference number (13) indicates that an instrument 30 performs telnet communication with a C2 server C2-4. The reference number (14) indicates that the instrument 30 performs http communication with a Webserver2 that provides a malware distribution site. The reference number (16) indicates that the instrument 30 performs http communication with a general Web server Taeget2.

Comparison indicates that the number of instruments 30 to which login is tried, C2 servers, and servers that provide malware distribution sites are different between FIGS. 4 and 5. On the other hand, for example, "occurrence of scanning from an optional transmission source" and "execution of download from a C2 server" are common to FIGS. 4 and 5. Thus, the pattern generation unit 155 generates the incident pattern "C2-Scan* C2-Download C2-Dos*" from the example illustrated in FIG. 5, similarly to the example illustrated in FIG. 4. Accordingly, the determination unit 156 can determine that the incident pattern generated from the example illustrated in FIG. 5 is identical to the incident pattern generated from the example illustrated in FIG. 4 in the past.

Figure 6:
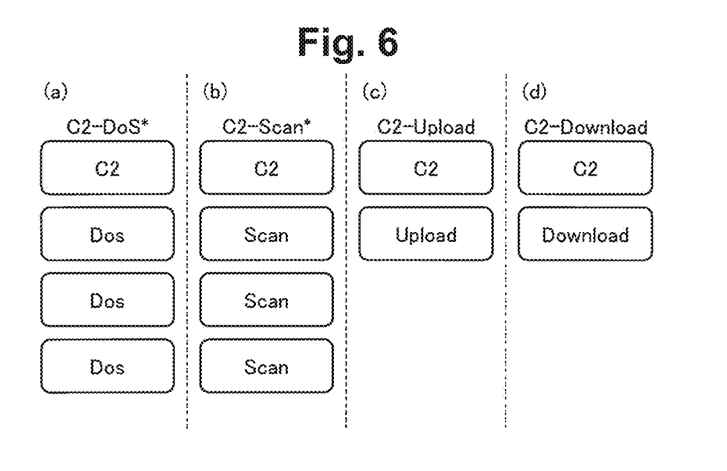
FIG. 6 is a diagram illustrating exemplary incident pattern elements according to the first embodiment.

The pattern generation unit 155 can determine incident pattern elements such as "C2-Scan", "C2-Download", and "C2-Dos" by referring to information as illustrated in FIG. 6. FIG. 6 is a diagram illustrating exemplary incident pattern elements according to the first embodiment. For example, (b) in FIG. 6 indicates that the pattern "C2-Scan*" is a pattern in which "Scan" occurs a plurality of times after communication with a C2. In addition, (c) in FIG. 6 indicates that the pattern "C2-Upload" is a pattern in which "Upload" occurs after communication with a C2.

The output unit 13 outputs the communication feature amount as a sensing target, and a cause of anomaly. In this case, the output unit 13 outputs, in the cause of anomaly, an incident pattern generated by the pattern generation unit 155. Incident response is performed to the information output from the output unit 13. The incident response is, for example, identification of a cause of anomaly by an administrator of the system with reference to the information output from the output unit 13. Then, the input unit 12 receives inputting of the cause of anomaly identified by the incident response. The cause of anomaly identified by the incident response may be expressed in a data format same as that of the incident pattern.

The cause of anomaly identified by the generation device 10 is identical or not identical to the cause of anomaly identified by the incident response, depending on cases. In such a case, the generation device 10 prioritizes the cause of anomaly identified by the incident response and stores the cause of anomaly in the cause-of-anomaly DB 143.

Then, the identification model generation unit 153 generates the identification model 142. Accordingly, the generation device 10 can reflect a result of the incident response to the identification model 142. [Processing of the first embodiment] The process of processing at the generation device 10 will be described below with reference to FIGS. 7 and 8. The processing at the generation device 10 is roughly divided into an initial setting phase and an operation phase. In the initial setting phase, the generation device 10 mainly executes collection or initial learning. In the operation phase, the generation device 10 mainly executes instrument anomaly sensing and cause-of-anomaly identification. The sensing model 141 and the identification model 142 are capable of executing anomaly sensing and cause-of-anomaly identification by using the operation log of an instrument 30 in addition to the communication feature amount. Similarly to the communication feature amount, the operation log is stored in the cause-of-anomaly DB 143.

Figure 7:
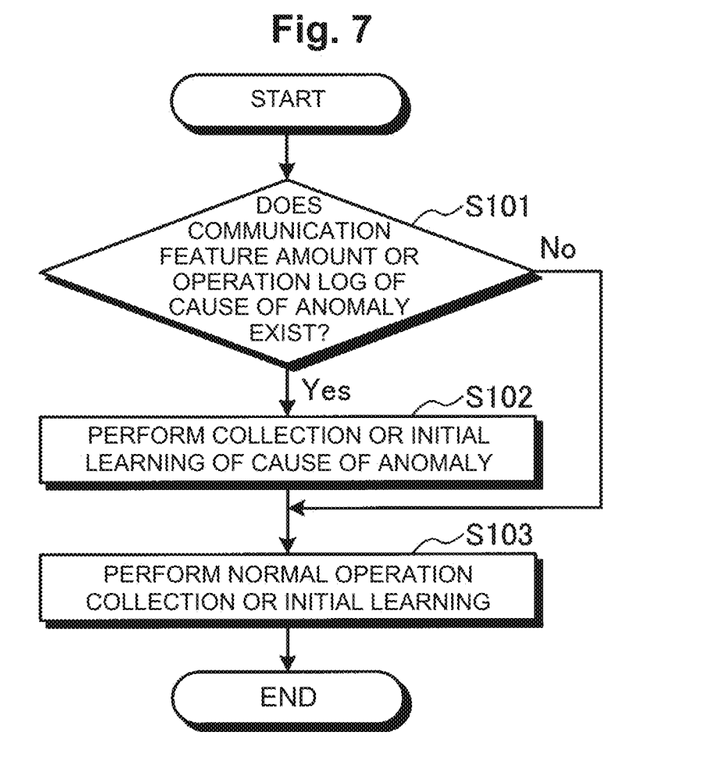
FIG. 7 is a flowchart illustrating the process of processing in an initial setting phase at the generation device according to the first embodiment.
Figure 8:
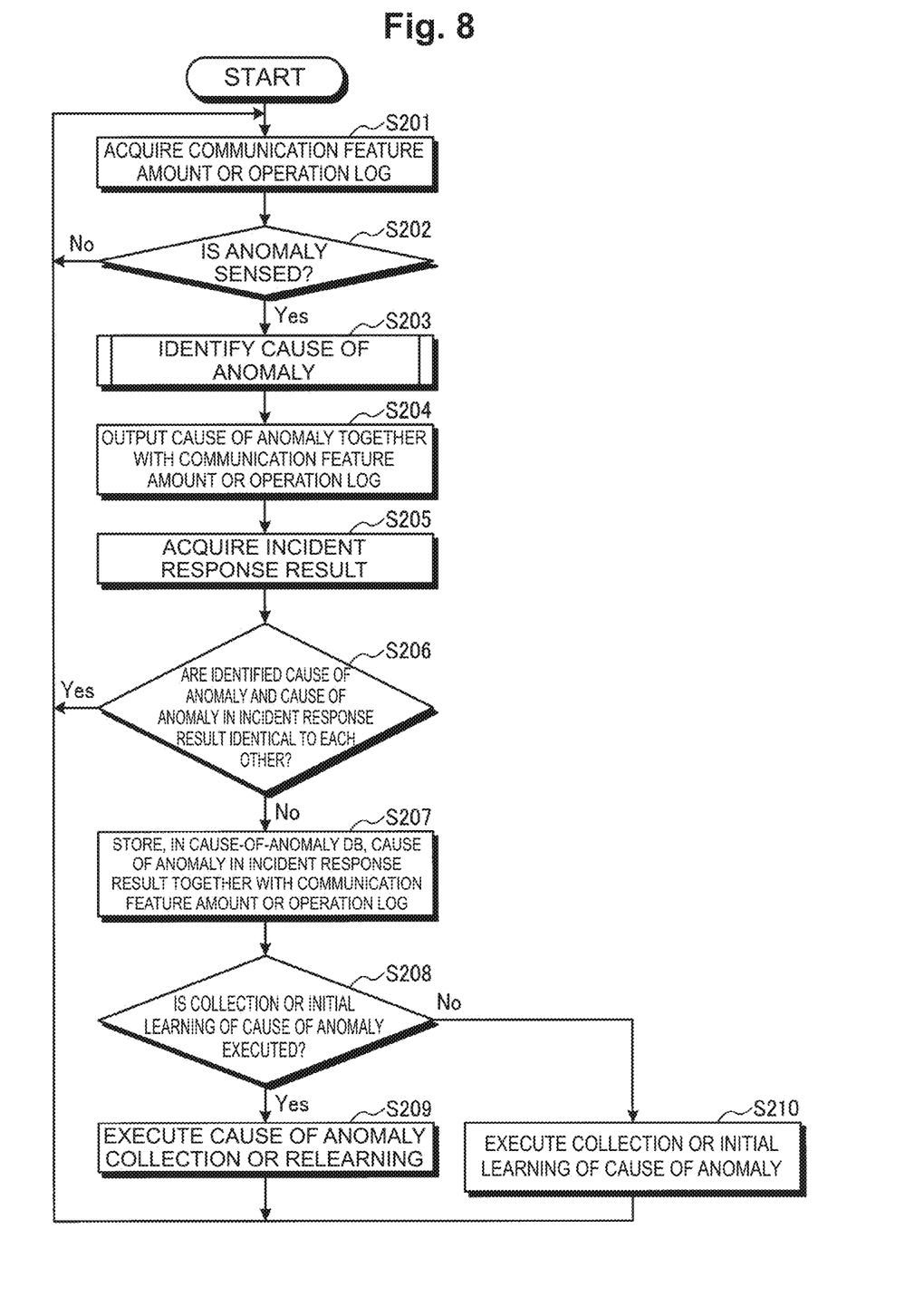
FIG. 8 is a flowchart illustrating the process of processing in an operation phase at the generation device according to the first embodiment.

FIG. 7 is a flowchart illustrating the process of processing in the initial setting phase at the generation device according to the first embodiment. As illustrated in FIG. 8, the identification model generation unit 153 first checks whether the communication feature amount or the operation log of a cause of anomaly exists in the cause-of-anomaly DB 143 (step S101).

When the communication feature amount or the operation log of a cause of anomaly exists in the cause-of-anomaly DB 143 (Yes at step S101), the identification model generation unit 153 executes collection or initial learning of the cause of anomaly, thereby generating the identification model 142 (step S102). When the communication feature amount or the operation log of a cause of anomaly does not exist in the cause-of-anomaly DB 143 (No at step S101), the identification model generation unit 153 does not execute the collection nor the initial learning of the cause of anomaly. In this manner, the identification model generation unit 153 may generate the identification model 142 only when a cause of anomaly and the communication feature amount or the operation log are stored in the cause-of-anomaly DB 143.

Subsequently, the sensing model generation unit 151 executes normal operation collection or initial learning based on the communication feature amount or the operation log when an instrument is in normal operation, thereby generating the sensing model 141 (step S103). The initial learning is, for example, processing of newly generating the sensing model 141 or the identification model 142 based on normal data or based on a cause of anomaly and the communication feature amount or the operation log stored in the cause-of-anomaly DB 143. For example, relearning is processing of updating the identification model 142 based on a cause of anomaly and the communication feature amount or the operation log stored in the cause-of-anomaly DB 143 and not stored at the initial learning.

FIG. 8 is a flowchart illustrating the process of processing in the operation phase at the generation device according to the first embodiment. As illustrated in FIG. 8, the sensing unit 152 first acquires the communication feature amount or the operation log of a sensing target instrument 30 (step S201). Subsequently, the sensing unit 152 inputs the acquired communication feature amount or operation log to the sensing model 141 (step S202). When no anomaly is sensed by the sensing unit 152 (No at step S202), the processing returns to step S201 and the sensing unit 152 acquires the communication feature amount or the operation log of the next sensing target instrument 30 (step S201).

When anomaly is sensed by the sensing unit 152 (Yes at step S202), the identification unit 154 identifies a cause of anomaly by inputting the communication feature amount or the operation log of the sensing target instrument 30 to the identification model 142 (step S203). The cause-of-anomaly identification processing will be described later with reference to FIG. 9.

Then, the output unit 13 outputs the communication feature amount or the operation log of the sensing target instrument 30 together with the cause of anomaly identified by the identification unit 154 (step S204). Then, the input unit 12 receives inputting of an incident response result (step S205).

When the cause of anomaly identified by the identification unit 154 and a cause of anomaly of the incident response result are identical to each other (Yes at step S206), the processing returns to step S201 and the sensing unit 152 acquires the communication feature amount and the operation log of the next sensing target instrument 30 (step S201).

When the cause of anomaly identified by the identification unit 154 and the cause of anomaly of the incident response result are not identical to each other (No at step S206), the identification model generation unit 153 stores, in the cause-of-anomaly DB 143, the cause of anomaly of the incident response result together with the communication feature amount or the operation log of the sensing target instrument 30 (step S207).

When the collection or the initial learning of the cause of anomaly (step S102 in FIG. 7) in the initial setting phase has been executed (Yes at step S208), the identification model generation unit 153 acquires, from the cause-of-anomaly DB 143, the cause of anomaly and the communication feature amount or the operation log, and executes the collection or the relearning of the cause of anomaly (step S209).

When the initial learning of the cause of anomaly (step S102 in FIG. 7) in the initial setting phase has not been executed (No at step S208), the identification model generation unit 153 acquires the cause of anomaly and the communication feature amount or the operation log from the cause-of-anomaly DB 143, and performs the collection or the initial learning of the cause of anomaly (step S210).

Once the collection or the relearning of the cause of anomaly is performed (step S209) or once the collection or the initial learning of the cause of anomaly is performed (step S210), the processing returns to step S201 and the sensing unit 152 acquires the communication feature amount or the operation log of the next sensing target instrument 30 (step S201).

Figure 9:
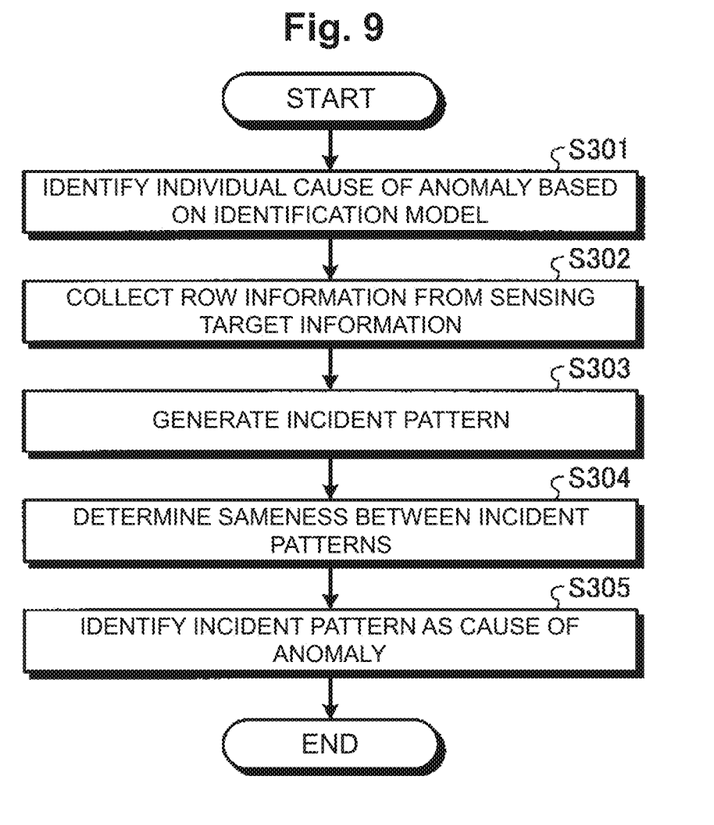
FIG. 9 is a flowchart illustrating the process of incident pattern generation processing according to the first embodiment.

The following describes the cause-of-anomaly identification processing (step S203 in FIG. 8) with reference to FIG. 9. In this example, the generation device 10 identifies, as a cause of anomaly, an individual cause of anomaly of each communication feature amount and an incident pattern. FIG. 9 is a flowchart illustrating the process of incident pattern generation processing according to the first embodiment.

As illustrated in FIG. 9, first, the identification unit 154 identifies an individual cause of anomaly of each communication feature amount by using the identification model 142 (step S301). The identification unit 154 identifies, for example, the IDS signature illustrated in FIG. 3.

Subsequently, the pattern generation unit 155 collects the row information from sensing target information (step S302) and generates an incident pattern (step S303). The determination unit 156 determines whether the incident pattern generated by the pattern generation unit 155 is identical to any incident pattern generated in the past (step S304). Then, the identification unit 154 identifies, as cause of anomaly, the incident pattern determined to be identical by the determination unit 156 (step S305).

[Effect of the first embodiment] The sensing unit 152 of the generation device 10 senses anomaly of the network 2 based on information having a plurality of items related to communication through the network 2. The identification unit 154 identifies a cause of anomaly corresponding to each piece of the information when anomaly is sensed by the sensing unit 152. The pattern generation unit 155 generates, based on values of the items in the information and the cause of anomaly identified by the identification unit 154, a cause-of-anomaly pattern for each predetermined set of pieces of the information. In this manner, the generation device 10 can generate an incident pattern for each predetermined set when anomaly is sensed. As a result, the generation device 10 can efficiently perform cause-of-anomaly identification.

For example, an incident pattern generated by the generation device 10 is useful for production of incident response by the system administrator. For example, consider a case in which no incident pattern is produced and a cause of anomaly identified for each communication feature amount is provided to the system administrator. In this case, based on the provided causes of anomaly, the system administrator searches for a report that includes description of incident response produced in the past and a handling method. When the provided causes of anomaly include duplication and those do not contribute to search, the system administrator cannot efficiently search for the report.

For example, assume that a series of causes of anomaly of "C2 communication", "login trial", "login trial", and "login trial" are provided to the system administrator based on the IDS signature of (1) to (4) in FIG. 3. Further, assume that, in the past, a series of causes of anomaly of "C2 communication", "login trial", "login trial", and "login trial" do not exist but a series of causes of anomaly of "C2 communication", "login trial", and "login trial" exist. In this case, the system administrator cannot search for a cause of anomaly that completely identical to the provided series of causes of anomaly. However, the generation device 10 can provide each above-described series of causes of anomaly as the same incident pattern. In this manner, the generation device 10 can support incident response performed by the system administrator.

The pattern generation unit 155 generates, based on meta information generated from the values of the items that information has, a pattern indicating combination of causes of anomaly per flow corresponding to the information, the pattern being capable of expressing that a plurality of flows correspond to each cause of anomaly. Accordingly, the generation device 10 can generate an incident pattern in which the number of flows is abstracted. In particular, it is possible to easily perform comparison and search of incident patterns between which combination of causes of anomaly is common but the number of flows is different.

The determination unit 156 refers to a storage unit storing a pattern generated by the pattern generation unit 155, and when a first pattern is generated by the pattern generation unit 155, the determination unit 156 determines whether the first pattern and the pattern stored in the storage unit are identical to each other. Accordingly, the generation device 10 can notify the system administrator of the existence of an identical incident pattern generated in the past, and thus can support incident response.

The sensing model generation unit 151 generates, based on information related to communication through the network 2 in normal operation, the sensing model 141 for sensing anomaly of the network 2. The identification model generation unit 153 generates, based on the information related to communication through the network 2, the identification model 142 for identifying a cause of anomaly of the network 2. The sensing unit 152 senses anomaly of the network 2 by using the sensing model 141 based on the sensing target information. The identification unit 154 identifies a cause of anomaly corresponding to each piece of the sensing target information by using the identification model 142 when anomaly is sensed by the sensing unit 152. The pattern generation unit 155 generates a cause-of-anomaly pattern for a set of pieces of the sensing target information per flow. In this manner, the generation device 10 can generate an incident pattern per flow when anomaly is sensed. As a result, the generation device 10 can provide an incident pattern that the system administrator can easily interpret. In addition, the generation device 10 can reinforce each model by generating an incident pattern.

[Other embodiments] The device configuration of the generation system 1 is not limited to that in FIG. 1. For example, the generation system 1 may include a sensing device having functions corresponding to the sensing model generation unit 151 and the sensing unit 152, and a generation device having functions corresponding to the identification model generation unit 153 and the identification unit 154. The generation device 10 may directly acquire the communication feature amount or the operation log of each instrument 30, not through the gateway device 20.

"Communication feature amount or operation log" in the above description may be replaced with "communication feature amount", "operation log", or "communication feature amount and operation log". For example, the sensing model 141 may be generated from both of a communication feature amount and an operation log. For example, the cause-of-anomaly DB 143 may store a cause of anomaly and an operation log.

For example, the sensing model generation unit 151 learns the operation log of each instrument 30 in normal operation and generates the sensing model 141 for sensing the instrument 30 being anomalous. The identification model generation unit 153 collects or learns the communication feature amount for each cause of anomaly of the instrument 30, and generates the identification model 142 for identifying each cause of anomaly of the instrument 30. The sensing unit 152 senses the instrument 30 being anomalous based on the sensing model 141 and the operation log acquired from the instrument 30. When the instrument 30 being anomalous is sensed by the sensing unit 152, the identification unit 154 identifies a cause of anomaly of the instrument 30 based on the identification model 142 and the communication feature amount acquired from the instrument 30.

[System configuration and the like] Each illustrated component of each device is functionally conceptual and does not necessarily need to be physically configured as illustrated in the drawings. In other words, the specific form of distribution and integration of the devices is not limited to those illustrated in the drawings, but the entire or part thereof may be functionally or physically distributed and integrated in arbitrary units in accordance with, for example, various loads and use statuses. Moreover, the entire or an optional part of each processing function performed at each device may be achieved by a CPU and a computer program analyzed and executed by the CPU or may be achieved as wired logic hardware.

Among the pieces of processing described in the present embodiment, the entire or part of processing described as automatically performed processing may be manually performed. Alternatively, the entire or part of processing described as manually performed processing may be automatically performed by a well-known method. In addition, processing procedures, control procedures, specific names, and information including various kinds of data and parameters, which are indicated in the above-described document and the drawings may be optionally changed unless otherwise stated.

[Computer program] As an embodiment, the generation device 10 may be implemented by installing, as package software or on-line software on a desired computer, a generation program that executes the above-described anomaly sensing processing and cause-of-anomaly identification processing. For example, an information processing device can function as the generation device 10 by executing the above-described generation program. Examples of the information processing device include desktop or laptop personal computers. In addition, the category of the information processing device includes a server instrument, a smartphone, a mobile communication terminal such as a cellular phone or a personal handyphone system (PHS), a slate terminal such as a personal digital assistant (PDA), and the like.

Alternatively, the generation device 10 may be implemented as an identification server device configured to provide, to a terminal device used by a user as a client, services related to the above-described anomaly sensing processing and cause-of-anomaly identification processing. For example, the identification server device is implemented as a server device configured to provide an identification service to which the communication feature amount and the operation log of an instrument are input and from which whether the instrument is anomalous and a cause of anomaly when the instrument is anomalous are output. In this case, the identification server device may be implemented as a Web server or may be implemented as a cloud configured to provide services related to the above-described anomaly sensing processing and cause-of-anomaly identification processing by outsourcing.

Figure 10:
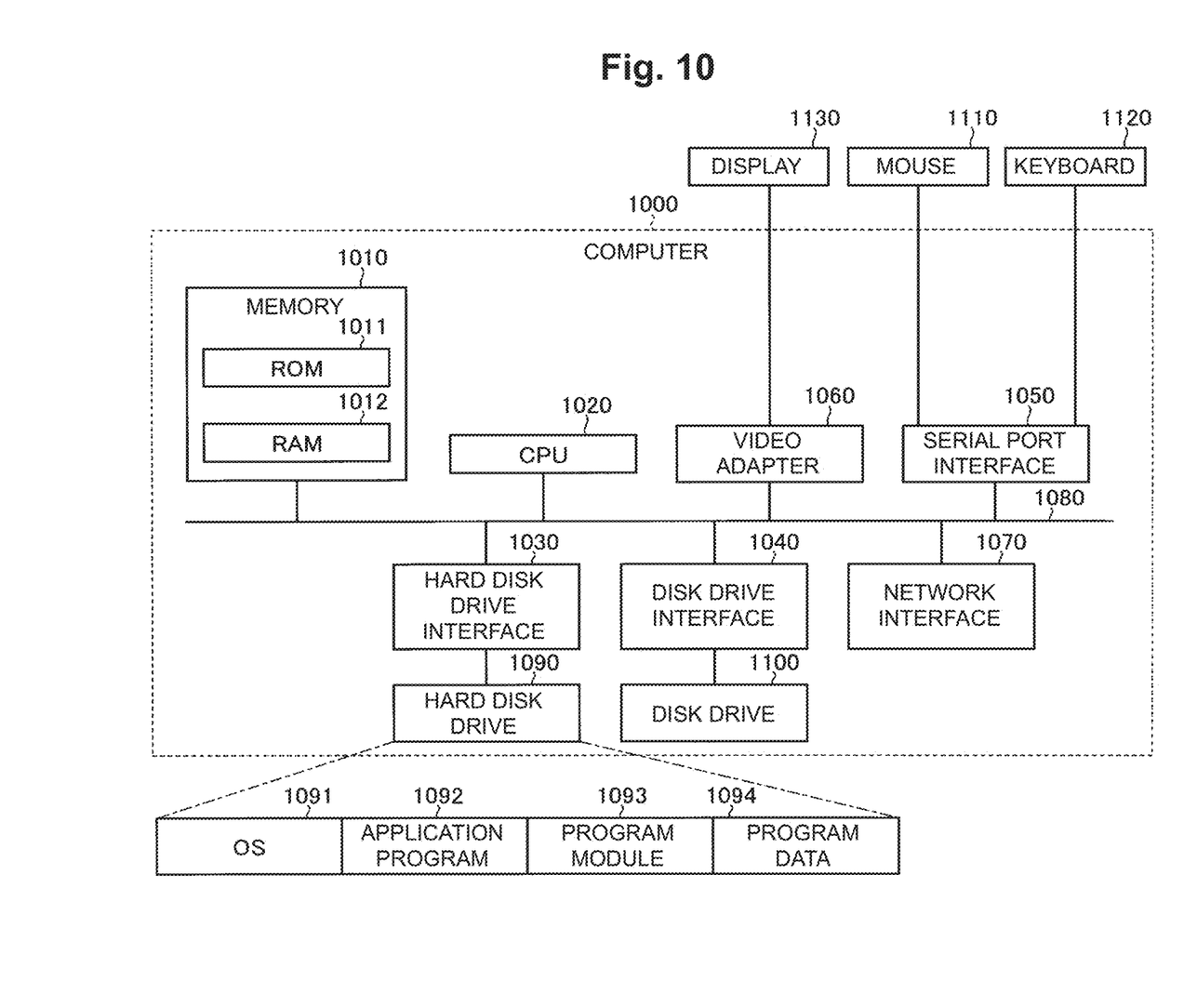
FIG. 10 is a diagram illustrating an exemplary computer that executes a generation program.

FIG. 10 is a diagram illustrating an exemplary computer that executes the generation program. This computer 1000 includes, for example, a memory 1010 and a CPU 1020. In addition, the computer 1000 includes a hard disk drive interface 1030, a disk drive interface 1040, a serial port interface 1050, a video adapter 1060, and a network interface 1070. These components are connected with one another through a bus 1080.

The memory 1010 includes a read only memory (ROM) 1011 and a RAM 1012. The ROM 1011 stores, for example, a boot program such as a basic input output system (BIOS). The hard disk drive interface 1030 is connected with a hard disk drive 1090. The disk drive interface 1040 is connected with a disk drive 1100. For example, a detachable storage medium such as a magnetic disk or an optical disk is inserted into the disk drive 1100. The serial port interface 1050 is connected with, for example, a mouse 1110 or a keyboard 1120. The video adapter 1060 is connected with, for example, a display 1130.

The hard disk drive 1090 stores, for example, an OS 1091, an application program 1092, a program module 1093, and program data 1094. Specifically, a computer program that defines each processing at the generation device 10 is implemented as the program module 1093 in which a computer-executable code is described. The program module 1093 is stored in, for example, the hard disk drive 1090. For example, the program module 1093 for executing processing same as that of a functional configuration of the generation device 10 is stored in the hard disk drive 1090. The hard disk drive 1090 may be an SSD instead.

Setting data used in processing of the above-described embodiment is stored in, for example, the memory 1010 or the hard disk drive 1090 as the program data 1094. The CPU 1020 reads, onto the RAM 1012 as necessary, each of the program module 1093 and the program data 1094 stored in the memory 1010 or the hard disk drive 1090 and executes the processing of the above-described embodiment.

The program module 1093 and the program data 1094 are not limited to storage in the hard disk drive 1090, but for example, may be stored in a detachable storage medium and read by the CPU 1020 through the disk drive 1100 or the like. Alternatively, the program module 1093 and the program data 1094 may be stored in another computer connected through a network (a LAN, a wide area network (WAN), or the like). In this case, the program module 1093 and the program data 1094 may be read from the other computer through the network interface 1070 by the CPU 1020.

REFERENCE SIGNS LIST 1 generation system
2 network
10 generation device
11 communication unit
12 input unit
13 output unit
14 storage unit
15 control unit
20 gateway device
30 instrument
141 sensing model
142 identification model
143 cause-of-anomaly DB
151 sensing model generation unit
152 sensing unit
153 identification model generation unit
154 identification unit
155 pattern generation unit
156 determination unit

The invention claimed is:

1. A generation device comprising:
a memory; and
processing circuitry coupled to the memory and configured to:
sense anomaly of a network based on information having a plurality of items related to communication in the network,
identify an intrusion detection and prevention signature as a cause of anomaly corresponding to each piece of the information when anomaly is sensed, the identification of the intrusion detection and prevention signature being based on a comparison of each piece of the information to a table associating row information including at least source addresses, destination addresses, source ports, destination ports, duration, and protocol to intrusion detection and prevention signatures, and
generate, based on values of the items in the information, source address classification and destination address classification, and the cause of anomaly identified, a cause-of-anomaly pattern for each predetermined set of pieces of the information.

2. The generation device according to claim 1, wherein the processing circuitry is further configured to generate, based on meta information generated from the values of the items in the information, a pattern indicating combination of causes of anomaly per flow corresponding to the information, the pattern expressing that a plurality of flows correspond to each cause of anomaly.

3. The generation device according to claim 1, wherein the processing circuitry is further configured to refer to a storage that stores the pattern generated and determine, when a first pattern is generated, whether the first pattern is identical to the pattern stored in the storage.

4. The generation device according to claim 1, wherein the processing circuitry is further configured to:
generate, based on information related to communication through the network in normal operation, a sensing model to sense anomaly of a network,
generate, based on the information related to communication through the network, an identification model to identify a cause of anomaly of the network,
sense anomaly of the network using the sensing model based on sensing target information,
identify a cause of anomaly corresponding to each piece of the sensing target information using the identification model when anomaly is sensed, and
generate a cause-of-anomaly pattern for a set of pieces of the sensing target information per flow.

5. The generation device according to claim 1, wherein the plurality of items include duration of the communication through the nets pork and a size of the communication through the network.

6. The generation device according to claim 5, wherein the size of the communication through the network includes at least one of a number of bytes uploaded or a number of bytes downloaded.

7. The generation device according to claim 1 wherein the classification of source and destination addresses indicates at least an in-network address, a general web address, or a server address.

8. The generation device according to claim 1, wherein the anomaly includes a malware attack.

9. The generation device according to claim 8, wherein the malware attack is a denial of service attack.

10. The generation device according to claim 9, wherein the anomaly is identified as a denial of service attack based on analysis of the communication in the network.

11. A generation method comprising:
sensing anomaly of a network based on information having a plurality of items related to communication in the network;
identifying an intrusion detection and prevention signature as a cause of anomaly corresponding to each piece of the information when anomaly is sensed, the identification of the intrusion detection and prevention signature being based on a comparison of each piece of the information to a table associating row information including at least source addresses, destination addresses, source ports, destination ports, duration, and protocol to intrusion detection and prevention signatures; and
generating, based on values of the items in the information, source address classification and destination address classification, and the cause of anomaly identified, a cause-of-anomaly pattern for each predetermined set of pieces of the information, by processing circuitry.

12. A non-transitory computer-readable recording medium storing therein a generation program that causes a computer to execute a process comprising:
sensing anomaly of a network based on information having a plurality of items related to communication in the network;
identifying an intrusion detection and prevention signature as a cause of anomaly corresponding to each piece of the information when anomaly is sensed, the identification of the intrusion detection and prevention signature being based on a comparison of each piece of the information to a table associating row information including at least source addresses destination addresses source ports, destination ports duration and protocol to intrusion detection and prevention signatures; and
generating, based on values of the items in the information, source address classification and destination address classification, and the cause of anomaly identified, a cause-of-anomaly pattern for each predetermined set of pieces of the information.

* * * * *